(12) United States Patent
Zhao et al.

(10) Patent No.: US 11,237,888 B2
(45) Date of Patent: Feb. 1, 2022

(54) MESSAGE PROCESSING METHOD AND SYSTEM, STORAGE MEDIUM AND ELECTRONIC DEVICE

(71) Applicant: BOE TECHNOLOGY GROUP CO., LTD., Beijing (CN)

(72) Inventors: Junjie Zhao, Beijing (CN); Jing Su, Beijing (CN); Qian Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/769,683

(22) PCT Filed: Dec. 4, 2018

(86) PCT No.: PCT/CN2018/119242
§ 371 (c)(1),
(2) Date: Jun. 4, 2020

(87) PCT Pub. No.: WO2019/109923
PCT Pub. Date: Jun. 13, 2019

(65) Prior Publication Data
US 2020/0327001 A1    Oct. 15, 2020

(30) Foreign Application Priority Data
Dec. 8, 2017  (CN) .......................... 201711296312.1

(51) Int. Cl.
*G06F 15/16*    (2006.01)
*G06F 9/54*     (2006.01)
(Continued)

(52) U.S. Cl.
CPC ............ *G06F 9/546* (2013.01); *G06F 9/5005* (2013.01); *G06F 9/5077* (2013.01)

(58) Field of Classification Search
CPC ....................................................... G06F 9/546
(Continued)

(56) References Cited

U.S. PATENT DOCUMENTS 9,450,772 B2 *  9/2016  Zhang .................... H04W 4/70
9,867,121 B2 *  1/2018  Wang ..................... H04W 4/08
(Continued)

FOREIGN PATENT DOCUMENTS

CA    2859059 A1    7/2013
CN    103200209 A   7/2013
(Continued)

OTHER PUBLICATIONS

International Search Report and Written Opinion dated Feb. 27, 2019 for PCT Patent Application No. PCT/CN2018/119242.
(Continued)

*Primary Examiner* — Hamza N Algibhah
(74) *Attorney, Agent, or Firm* — Thomas | Horstemeyer, LLP

(57) ABSTRACT

The present disclosure is related to a message processing method, which belongs to the field of information processing techniques. The message processing method includes: receiving a first request comprising a first resource identifier; determining whether the first resource identifier exists in a group resource comprising a plurality of second resource identifiers and group members corresponding to the second resource identifiers one by one; and sending the first request to other group member in the group resource than the group member corresponding to the first resource identifier when determining that the first resource identifier exists in the group resource.

20 Claims, 5 Drawing Sheets

(51) Int. Cl.
*H04L 29/06* (2006.01)
*G06F 9/50* (2006.01)

(58) Field of Classification Search
USPC .......................................................... 709/204
See application file for complete search history.

(56) References Cited

U.S. PATENT DOCUMENTS

| | | | | |
|---|---|---|---|---|
| 2011/0201365 A1* | 8/2011 | Segura | ................... | H04W 4/70 |
| | | | | 455/466 |
| 2012/0281649 A1* | 11/2012 | Zhou | ................... | H04W 72/048 |
| | | | | 370/329 |
| 2013/0046841 A1* | 2/2013 | Park | ................... | H04W 8/186 |
| | | | | 709/206 |
| 2013/0272186 A1* | 10/2013 | Mohanty | ................ | H04J 11/00 |
| | | | | 370/312 |
| 2013/0301515 A1* | 11/2013 | Kim | ................... | H04L 1/1864 |
| | | | | 370/312 |
| 2013/0346504 A1* | 12/2013 | Huang | .................. | H04L 41/00 |
| | | | | 709/204 |
| 2013/0346564 A1* | 12/2013 | Warrick | ............. | H04L 65/4084 |
| | | | | 709/219 |
| 2014/0115169 A1* | 4/2014 | Gao | ................... | H04L 67/1014 |
| | | | | 709/226 |
| 2014/0126581 A1* | 5/2014 | Wang | ................ | H04L 41/0806 |
| | | | | 370/431 |
| 2014/0369251 A1* | 12/2014 | Zhang | ................ | H04L 12/1877 |
| | | | | 370/312 |
| 2015/0074280 A1 | 3/2015 | Gao et al. | | |
| 2016/0007138 A1* | 1/2016 | Palanisamy | ............. | H04W 4/50 |
| | | | | 455/41.2 |
| 2016/0226865 A1 | 8/2016 | Chen et al. | | |
| 2016/0226885 A1* | 8/2016 | Dziadosz | ................ | H04L 67/16 |
| 2016/0278121 A1 | 9/2016 | Agiwal et al. | | |
| 2018/0124576 A1 | 5/2018 | Yang | | |
| 2018/0176745 A1* | 6/2018 | Yang | ....................... | H04L 67/12 |
| 2018/0288184 A1* | 10/2018 | Yang | ....................... | H04L 67/12 |

FOREIGN PATENT DOCUMENTS

| | | |
|---|---|---|
| CN | 103297468 A | 9/2013 |
| CN | 103888344 A | 6/2014 |
| CN | 105634989 A | 6/2016 |
| CN | 105635930 A | 6/2016 |
| CN | 106332177 A | 1/2017 |
| EP | 2706729 A1 | 3/2014 |
| EP | 2782367 A1 | 9/2014 |
| EP | 3094117 A1 | 11/2016 |
| EP | 3151589 A1 | 4/2017 |
| EP | 3214809 A1 | 9/2017 |
| EP | 3319346 A1 | 5/2018 |
| EP | 3367709 A1 | 8/2018 |
| WO | 2016074455 A1 | 5/2016 |

OTHER PUBLICATIONS

1st Office Action dated Feb. 12, 2020 for Chinese Patent Application No. 201711296312.1.
2nd Office Action dated Aug. 17, 2020 for Chinese Patent Application No. 201711296312.1.

* cited by examiner

MESSAGE PROCESSING METHOD AND SYSTEM, STORAGE MEDIUM AND ELECTRONIC DEVICE

CROSS-REFERENCE TO RELATED APPLICATIONS

The present application is based upon International Application No. PCT/CN2018/119242, filed on Dec. 4, 2018 which claims priority to Chinese Patent Application No. 201711296312.1, titled "MESSAGE PROCESSING METHOD AND SYSTEM, STORAGE MEDIUM AND ELECTRONIC DEVICE" and filed on Dec. 8, 2017, the entire contents of which are incorporated herein by reference.

TECHNICAL FIELD

The present disclosure relates to the field of information processing technique, and in particular, to a message processing method, a message processing system, a computer-readable storage medium and an electronic device.

BACKGROUND

With the development of the Internet of Things technology, more and more terminal devices access the network and register with servers. The server creates corresponding resources for the terminal. The resources may not only indicate the state of the terminal, but also the function of the terminal.

The control of the terminal by an application device may be achieved through operating the corresponding resources by the terminal. Common operations may include creating, updating, retrieving, deleting, notifying, and so on.

When a large number of terminals access the network and register with the servers, it is necessary to provide an efficient message processing method and system to reduce the number of requests sent and improve the efficiency of the system.

SUMMARY

Embodiments of the present disclosure relates to a message processing method, a message processing system, a computer-readable storage medium and an electronic device.

According to an aspect of the present disclosure, there is provided a message processing method, including:

receiving a first request including a first resource identifier;

determining whether the first resource identifier exists in a group resource including a plurality of second resource identifiers and group members corresponding to the second resource identifiers one by one; and sending the first request to other group member in the group resource than the group member corresponding to the first resource identifier when determining that the first resource identifier exists in the group resource.

In an exemplary embodiment of the present disclosure, the message processing method further includes, after the step of determining whether the first resource identifier exists in a group resource including a plurality of second resource identifiers and group members corresponding to the second resource identifiers one by one:

sending the first request to all of the group members in the group resource when determining that the first resource identifier information does not exist in the group resource.

In an exemplary embodiment of the present disclosure, the message processing method further includes, after the step of sending the first request to other group member in the group resource than the group member corresponding to the first resource identifier:

receiving and aggregating a response message sent by the other group member in response to the first request, and sending the response message aggregated to the group member corresponding to the first resource identifier.

In an exemplary embodiment of the present disclosure, the message processing method further includes, after the step of sending the first request to other group member in the group resource than the group member corresponding to the first resource identifier:

storing the respective second resource identifier information in the group resource into the group member set in the group resource.

In an exemplary embodiment of the present disclosure, the message processing method further includes, after the step of sending the first request to all of the group members in the group resource:

adding the first resource identifier information to the requested resource set.

In an exemplary embodiment of the present disclosure, the message processing method further includes:

receiving a second request including a third resource identifier, and determining whether the third resource identifier exists in the subscribed resource list; and sending the second request to other group member than the group member corresponding to the respective resource identifier in the subscribed resource list when determining that the third resource identifier exists in the subscribed resource list.

In an exemplary embodiment of the present disclosure, the first request comprises one or more of a creating request, an updating request, a deleting request, a retrieving request, a subscribing request, and a notifying request.

According to an aspect of the present disclosure, there is provided a message processing system, including:

a request receiving module, configured to receive a first request including a first resource identifier;

a resource identifier determining module, configured to determine whether the first resource identifier exists in a group resource including a plurality of second resource identifiers and group members corresponding to the second resource identifiers one by one; and a request sending module, configured to send the first request to other group member in the group resource than the group member corresponding to the first resource identifier when determining that the first resource identifier exists in the group resource.

According to an aspect of the present disclosure, there is provided a non-transitory computer-readable storage medium having a computer program stored thereon. The computer program, when being executed by a processor, causes the processor to implement any one of the above message processing methods.

According to an aspect of the present disclosure, there is provided an electronic device, including:

at least one hardware processor; and a memory storing instructions being executable by the at least one hardware processor, the at least one hardware processor is configured to, by executing the instructions, implement any one of the above message processing methods.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with the present disclosure, and server to, together with the specification, explain the principles of the present disclosure. Understandably, the drawings in the following description are only some embodiments of the present disclosure. For those of ordinary skill in the art, without paying any creative work, other drawings can be obtained based on these drawings.

DETAILED DESCRIPTION

Figure 1:
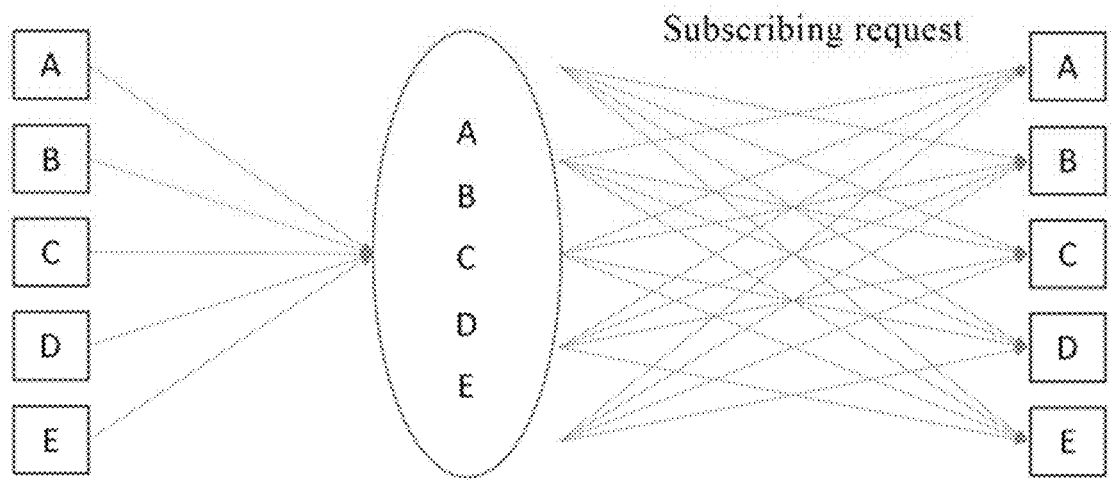
FIG. 1 schematically shows a schematic diagram of sending and responding to a message subscription.
Figure 2:
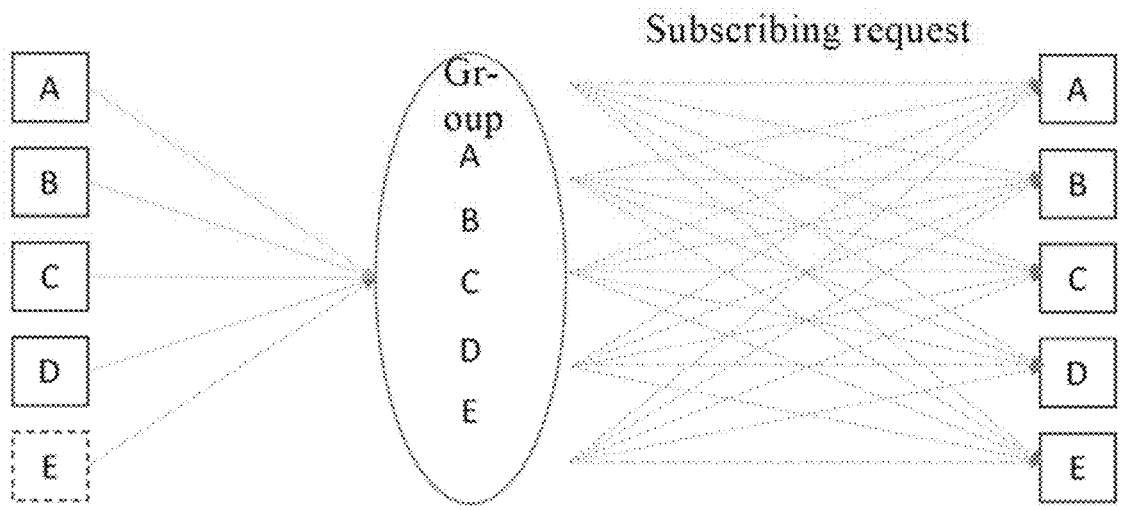
FIG. 2 schematically shows another schematic diagram of sending and responding to a message subscription.

Example embodiments will now be described more fully with reference to the drawings. However, the example embodiments may be implemented in various forms, and should not be construed as being limited to the examples set forth herein; on the contrary, these embodiments are provided so that the present disclosure is more comprehensive and complete, and the concept of the example embodiments is fully conveyed to those skilled in the art. The described features, structures, or characteristics may be combined in one or more embodiments in any suitable manner. In the following description, many specific details are provided for sufficient understanding of the embodiments of the present disclosure. However, those skilled in the art will realize that the technical solutions of the present disclosure may be practiced without one or more of the specific details, alternatively other methods, components, devices, steps, etc. may be adopted. In other cases, well-known technical solutions are not shown or described in detail in order to avoid overwhelming the subject and obscuring aspects of the present disclosure.

In addition, the drawings are only schematic illustrations of the present disclosure and are not necessarily drawn to scale. The same reference numerals in the drawings denote the same or similar parts, and thus their repeated description will be omitted. Some of the block diagrams shown in the drawings are functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

The Internet of Things system is a bridge between an information producer and an information consumer, and a specific communication process thereof may include: first, the producer may continuously send information to the Internet of Things system; second, the Internet of Things system may receive and store the information generated by the producer; finally, the consumer may continuously obtain the information from the Internet of Things system for consumption.

Further, the Internet of Things system includes two types of entities, i.e., an application entity (AE) and a common service entity (CSE), one entity of which may register with the other entity. For example, the AE may register with the CSE, the CSE may also register with the CSE, and after successful registration, a resource (AE or CSE) is created on the CSE. The AE may operate the resource on the CSE through an operation such as CRUDN (creating, updating, retrieving, deleting, and notifying), for example, update a container content under the AE resource through an UPDATE operation.

All entities in the system (including the application entity AE, the common service entity CSE, data, etc.) are represented by the resources. The resource may be uniquely identified and include an attribute and a sub-resource. The attribute is used to store resource-related information, the sub-resource is the resource at a lower level of the resource, and the resource includes an index to the sub-resource.

Under the architecture of the Internet of Things system, a function related to a device and a platform is identified by the resource. Among them, an <AE> resource may be used to identify an application logic in a physical device, a <node> may be used to identify relevant information of the physical device, a <container> may be used as a container and store specific content information, a <group> resource may combine the resources for management.

In order to facilitate the management of a plurality of entity resources, it is usually managed in groups to create a <group> resource directing to the plurality of entity resources. The Internet of Things system includes a variety of operation methods for the group resources, including creating, retrieving, updating, deleting, subscribing and the like. The following description takes the subscribing of the group resources as an example, which may achieve the effect of subscribing to a plurality of group members at once. A group subscription notification included in the Internet of Things system may include the following steps: first, sending a subscription resource creating request to a sub-resource <fanOutPoint> in a group; second, sending the subscription resource creating request to each member in the group when the CSE receives the request, and creating a <subscription> resource, by each member in the group, based on the received subscription resource creating request, so that the requester may subscribe to an information change of each member in the group. For example, AE1 subscribes to resource changes of AE2 . . . AEn in the group, and is notified when the resources of AE2 . . . AEn change.

Figure 3:
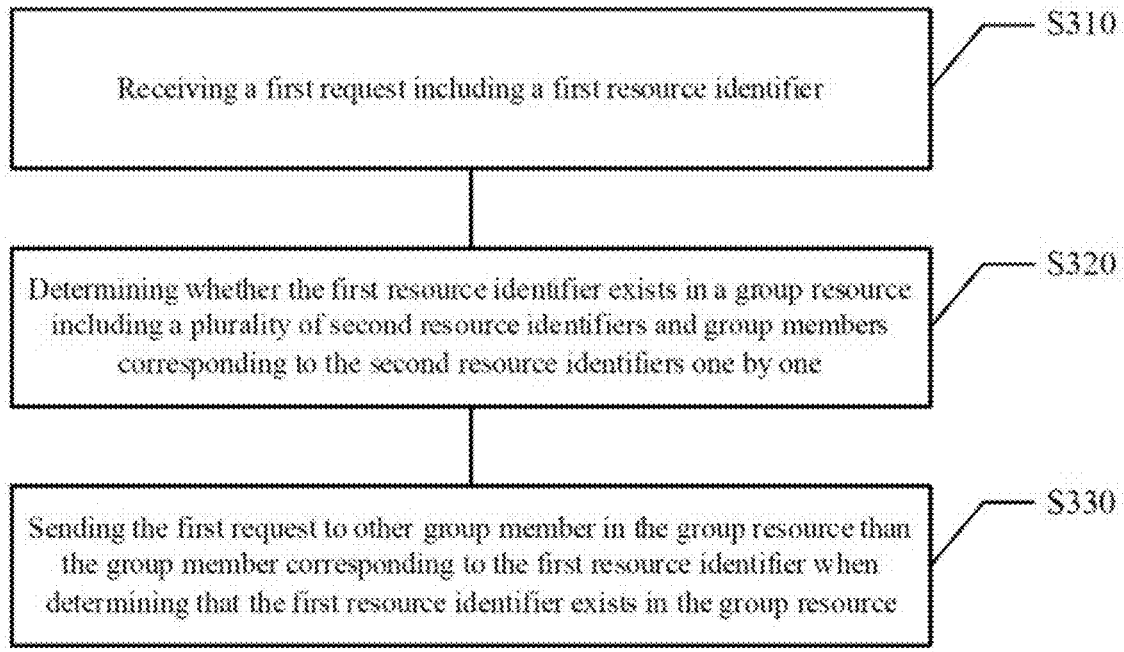
FIG. 3 schematically shows a flowchart of another message processing method.

Firstly, an example embodiment provides a message processing method. As shown in FIG. 3, the message processing method may include:

step S310, receiving a first request including a first resource identifier;

step S320, determining whether the first resource identifier exists in a group resource including a plurality of second resource identifiers and group members corresponding to the second resource identifiers one by one; and step S330, sending the first request to other group member in the group resource than the group member corresponding to the first resource identifier when determining that the first resource identifier exists in the group resource.

In the above message processing method, on the one hand, when it is determined that the first resource identifier exists in the group resource, the first request is sent to the other group member, thereby reducing the number of times of sending a subscription resource creating request to the members in the group and the number of times of responding to the subscription resource creation request by the members in the group, which improves the efficiency of message processing. On the other hand, since the number of times of sending the first request to the members in the group and that of responding to the first request by the members in the group are reduced, the speed of sending the first request and the speed of responding to the first request are increased, which improves service quality of the system and improves user experience.

In the following, each step in the above message processing method of the example embodiment will be explained and illustrated in detail.

In step S310, the first request, including the first resource identifier, is received, which will be described in detail in the following.

First, a resource will be explained and illustrated. In a conventional Internet of Things system, any of an M2M device, an M2M gateway or an M2M service platform and an application registered thereon may be abstracted as the resource and have a unique resource identifier, namely URI (Uniform Resource Identifier). The source may be uniquely located according to the resource identifier. A requested operation on an accessed resource includes retrieving, creating, updating, deleting, notifying and the like. It should be noted that a plurality of resources may exist on the device to which the accessed resource belongs. The device to which the accessed resource belongs may determine the resource that the resource of a requester wishes to access according to the identifier of the accessed resource.

Next, step S310 will be explained and illustrated based on the above resource. First, the first request including the first resource identifier sent by any group member (or other members, which is not particularly limited in this example) is received. The group member may be, for example, <AE1> or any one of <AE2, AE3, . . . , AEn>, etc., which is not specifically limited in this example. Further, the first request above may include, for example, retrieving, creating, updating, deleting, and notifying, etc. For example, any member (for example, AE1), when planning to create the group resource, may first send the first request to the CSE; then, the CSE, after receiving the first request, responds to the first request and creates the group resource. It should be further noted here that that it may also be AE2, AE3, AEn that sends the first request to the CSE, which is not specifically limited in this example.

In step S320, it is determined whether the first resource identifier exists in the group resource comprising the plurality of second resource identifiers and the group members corresponding to the second resource identifiers one by one, which will be described in detail in the following.

After the above first request is received, it may be determined whether the first resource identifier included in the first request exists in the group resource. The group resource may include the plurality of second resource identifiers and the group members corresponding to the second resource identifiers one by one. For example, the group member that may be included in the group resource may be <AE1>, or <AE2, AE3, . . . , AEn> and so on.

Figure 4:
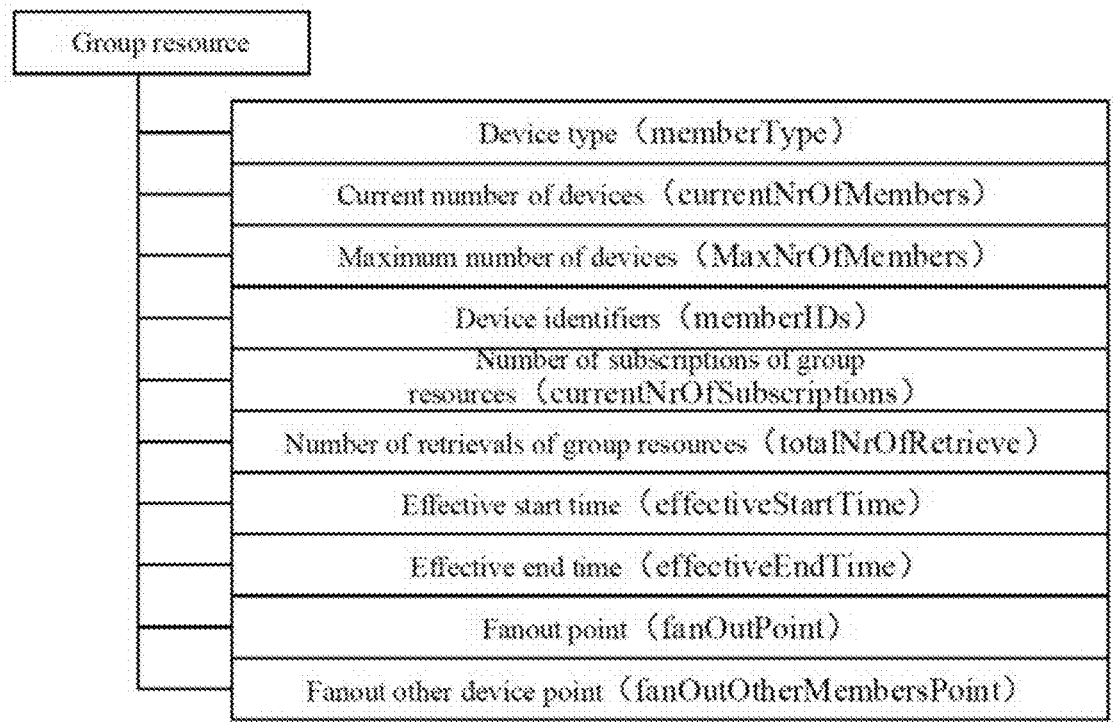
FIG. 4 schematically shows an example of a group resource structure.

Further referring to FIG. 4, parameters that may be included in the above group resource may include: a device type (memberType), a current number of devices (currentNrOfMembers), a maximum number of devices (MaxNrOfMembers), device identifiers (memberIDs), a number of subscriptions of group resources (currentNrOfSubscriptions), an effective start time (effectiveStartTime), an effective end time (effectiveEndTime), a fanout point (fanOutPoint), a fanout other device point (fanOutOtherMembersPoint), etc. Further, the above request for creating the group resource may direct to <CSEBase>/<group>/<fanOutOtherMembersPoint>.

Further, the above group resource may further include a group member set, the group member set may include one or more of the second resource identifiers, and the group member set may be a group member list. The determining whether the first resource identifier exists in the group resource including the plurality of second resource identifiers and group members corresponding to the second resource identifiers one by one includes: determining whether the first resource identifier exists in the group member set For example, after receiving the above-mentioned first request, it may be determined whether the first resource identifier included in the first request exists in the group member set including one or more of the second resource identifiers. By configuring the group member set in the group resource, query of the first resource identifier may be facilitated, which improves a speed of the query.

Further, the above group resource may further include a requested resource set, and the requested resource set includes one or more of the second resource identifiers. The determining whether the first resource identifier exists in the group resource including the plurality of second resource identifiers and the group members corresponding to the second resource identifiers one by one includes: determining whether the first resource identifier exists in the requested resource set.

For example, after receiving the above first request, it may be determined whether the first resource identifier included in the first request exists in the above requested resource set including one or more of the second resource identifiers. The requested resource set may include a created resource list, an updated resource list, a deleted resource list, an retrieved resource list, a subscribed resource list, a notified resource list, etc. Further, the requested resource set may be a requested resource list.

In step S330, the first request is sent to the other group member in the group resource than the group member corresponding to the first resource identifier when it is determined that the first resource identifier exists in the group resource, which will be described in detail in the following.

Figure 5:
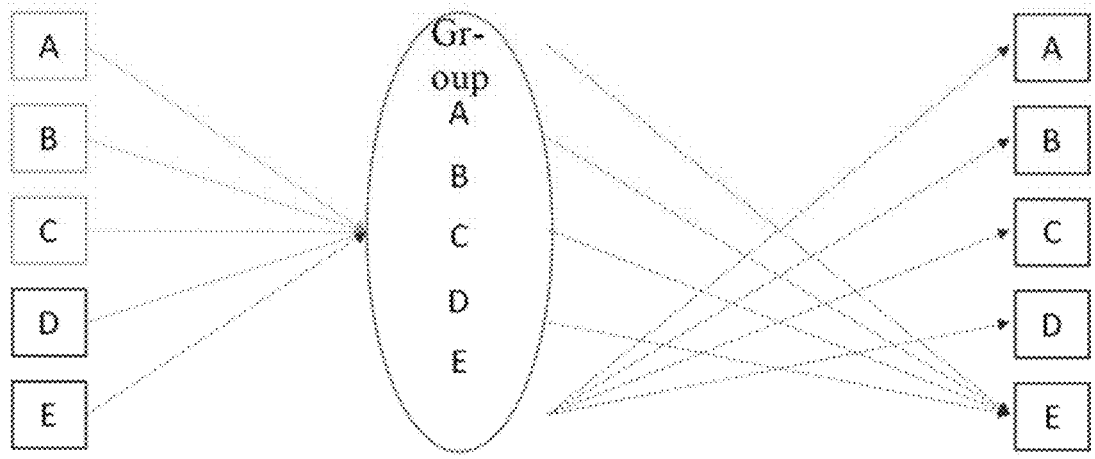
FIG. 5 schematically shows a schematic diagram of sending and responding to a subscription resource creating request.

When it is determined that the first resource identifier exists in the group resource, referring to FIG. 5, the first request may be sent to the other group member (for example, AE2, AE3, . . . , AEn) in the above group resource than the group member (for example, AE1) corresponding to the first resource identifier. By using such method, the number of times of sending a subscription resource creating request and responding thereto is greatly reduced. For example, in the prior art, the total number of times of sending and responding is $n^2$, while in the present technical solution, the number of times of sending and responding is $(n-1)^2$, therefore, it can be reduced by 2n times. It should be further noted here that when AE2, AE3, AEn need to subscribe to messages of other group members, it may also be implemented in the same manner as described above, which will not be repeated in the present disclosure.

Further, after sending the above first request to the other group member in the group resource than the group member corresponding to the first resource identifier, it may be also necessary to receive feedback information of the group member on the first request, which may specifically include: receiving and aggregating a response message sent by the other group member in response to the first request, and sending the response message aggregated to the group member corresponding to the first resource identifier, which will be described in detail in the following.

The other group member (for example, AE2, AE3, AEn), when receiving the above first request, responds to the first request and sends the response message generated by responding to the first request to the CSE. The CSE, after receiving the respective response message, aggregates the respective response message and sends the response message aggregated to AE1, so that AE1 may subscribe to various messages of AE2, AE3, AEn (such as creating, updating, retrieving, deleting, notifying, etc.). In this way, the number of messages that AE1 receives and confirms may be greatly reduced, and a speed at which AE1 subscribes to the messages of the other group member may be increased.

Further, when it is determined that the first resource identifier does not exist in the group resource, the message processing method may further include: sending the first request to all of the group members in the group resource when determining that the first resource identifier information does not exist in the group resource, which will be described in detail in the following.

When it is determined that the first resource identifier information does not exist in the group resource (a new member is added to the group resource), the first request is sent to all of the group members in the group resource. For example, in the prior art, the total number of times of sending and responding is $(n+1)^2$, while in the present solution, the number of times of sending and responding is $n^2$, therefore, 2n+1 times can be reduced. It can be seen that in such solution, the number of times of sending and responding can be greatly reduced, which improves the speed of subscription and reduces the system load.

Further, in order for the CSE to determine whether each device has been subscribed to according to a subscribed device identifier information group, the message processing method may further include: storing the respective second resource identifier information in the group resource into the group member set in the group resource, which will be described in detail in the following.

After sending the first request to the other group member in the group resource than the group member corresponding to the first resource identifier, the respective second resource identifier (e.g., <AE1>, <AE2, AE3, . . . , AEn>) in the group resource is stored in the group member set (subscribedMemberIDs).

Further, in order to allow a newly added group member to directly subscribe to the message when subscribing to the message next time, the message processing method further includes adding the first resource identifier information to the requested resource set, which will be described in detail in the following.

When it is determined that the first resource identifier does not exist in the group resource, the first resource identifier may be added to the requested resource set (subscribedMemberIDs). A data structure in the subscribedMemberIDs may include: AE1=AE2, AE3, AEn, etc., and may also include other data structures, which is not specifically limited in this example.

Figure 6:
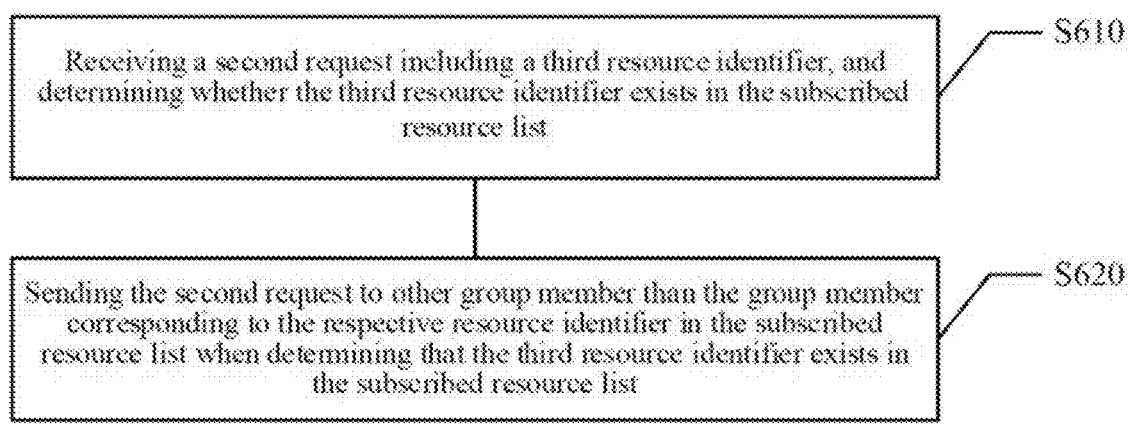
FIG. 6 schematically shows another schematic diagram of a message processing method.

In order to further reduce the number of sending and responding to the first request, after adding the resource identifier to the subscribed device identifier information group, referring to FIG. 6, the message processing method may further include step S610 and step S620.

In step S610, a second request including a third resource identifier is received, and it is determined whether the third resource identifier exists in the subscribed resource list.

In step S620, the second request is sent to other group member than the group member corresponding to the respective resource identifier in the subscribed device identifier information group when determining that the third resource identifier exists in the subscribed resource list.

Further, the above steps S610 and S620 will be explained and illustrated. The second request (for example, the second request sent by F) including the third resource identifier is received, and then it is determined whether the third resource identifier corresponding to F exists in the subscribed device identifier information group (subscribedMemberIDs). When it is determined that the third resource identifier corresponding to F exists in the subscribed device identifier information group (subscribedMemberIDs), the second request is directly sent to the other group member than the group member corresponding to the respective resource identifier in the subscribed device identifier information group (subscribedMemberIDs). It should be further noted here that the above second request may also include retrieving, creating, updating, deleting, and notifying, etc., for example.

Further, in order to facilitate the determination of the legitimacy of the request according to the resource identifier when receiving a creating request sent by the group member, so as to improve the security of the entire system, the message processing method may further include: receiving a registering request including the first resource identifier sent by the respective group member, and in response to the registering request, registering the respective group member according to the respective first resource identifier, which will be described in detail in the following.

The CSE, when receiving the registering request including the first resource identifier sent by the group members AE1, AE2, AE3, . . . , AEn, registers each group member in response to the registering request according to each first resource identifier. The registered device group may include <AE1>, <AE2, AE3, . . . , AEn>, and so on.

Figure 7:
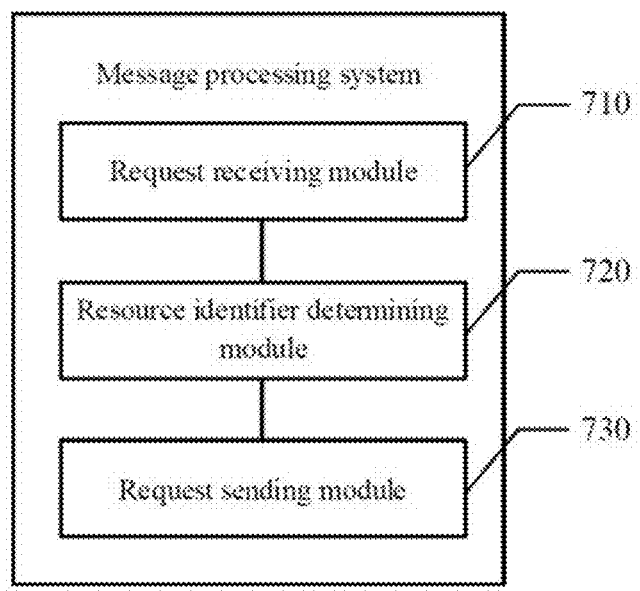
FIG. 7 schematically shows a block diagram of a message processing system.

The present disclosure also provides a message processing system. Referring to FIG. 7, the message processing system may include a request receiving module 710, a resource identifier determining module 720, and a request sending module 730.

The request receiving module 710 may be configured to receive a first request including a first resource identifier.

The resource identifier determining module 720 may be configured to determine whether the first resource identifier exists in a group resource including a plurality of second resource identifiers and group members corresponding to the second resource identifiers one by one; and The request sending module 730 may be configured to send the first request to other group member in the group resource than the group member corresponding to the first resource identifier when determining that the first resource identifier exists in the group resource.

The specific details of each module in the above message processing system have been described in detail in the corresponding message processing method, which will not be repeated here.

In addition, although the respective steps of the method in the present disclosure are described in a specific order in the drawings, which does not require or imply that the steps must be performed in the specific order, or all the steps shown must be performed to achieve a desired result. Additionally or alternatively, some steps may be omitted, multiple steps may be combined into one step for execution, and/or one step may be decomposed into multiple steps for execution, etc.

Through the description of the above embodiments, those skilled in the art may easily understand that the example embodiments described here may be implemented by software, or may be implemented by software in combination with necessary hardware. Therefore, the technical solution according to the embodiments of the present disclosure may be embodied in the form of a software product, which may be stored in a non-volatile, non-transitory storage medium (which may be a CD-ROM, U disk, mobile hard disk, etc.) or on a network, and may include several instructions to cause a computing device (which may be a personal computer, server, mobile terminal, or network device, etc.) to perform the method according to the embodiments of the present disclosure.

In an exemplary embodiment of the present disclosure, an electronic device capable of implementing the above method is also provided.

Those skilled in the art can understand that various aspects of the present disclosure may be implemented as a system, method, or program product. Therefore, various aspects of the present disclosure may be specifically implemented in the following forms, namely: a complete hardware implementation, a complete software implementation (including firmware, microcode, etc.), or a combination of hardware and software implementations, which may be collectively referred to as "circuit", "module" or "system" herein.

An electronic device 800 according to an embodiment of the present disclosure will be described below with reference to FIG. 8. The electronic device 800 shown in FIG. 8 is only an example, and should not bring any limitation to functions and use scope of the embodiments of the present disclosure.

Figure 8:
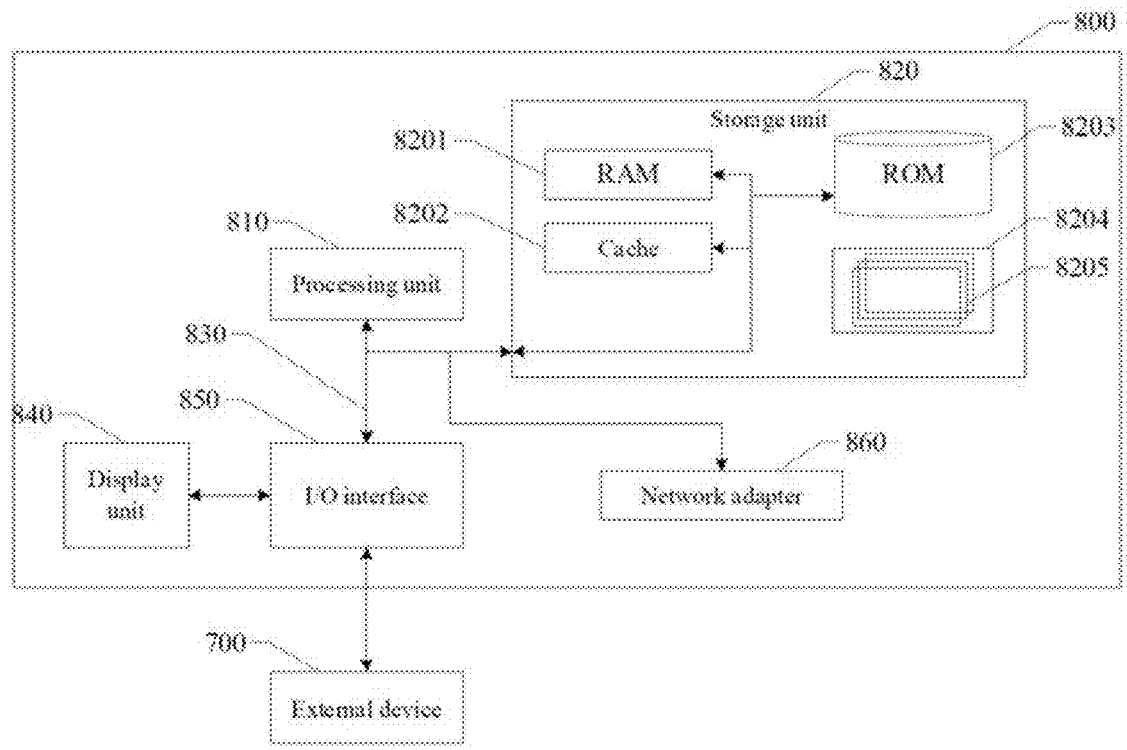
FIG. 8 schematically shows an electronic device for implementing the above message processing method.

As shown in FIG. 8, the electronic device 800 is represented in the form of a general-purpose computing device. Components of the electronic device 800 may include, but are not limited to: at least one of the above processing unit 810, at least one of the above storage unit 820, and a bus 830 connecting different system components (including the storage unit 820 and the processing unit 810).

The storage unit stores a program code, and the program code can be executed by the processing unit 810, so that the processing unit 810 executes the steps in various exemplary embodiments of the present disclosure described in the "exemplary method" section of this specification. For example, the processing unit 810 may execute the following steps shown in FIG. 3: step S310, receiving a first request including a first resource identifier; step S320, determining whether the first resource identifier exists in a group resource including a plurality of second resource identifiers and group members corresponding to the second resource identifiers one by one; and step S330, sending the first request to other group member in the group resource than the group member corresponding to the first resource identifier when determining that the first resource identifier exists in the group resource.

The storage unit 820 may include a readable medium in the form of a volatile storage unit, such as a random access storage unit (RAM) 8201 and/or a cache storage unit 8202, and may further include a read-only storage unit (ROM) 8203.

The storage unit 820 may further include a program/utility tool 8204 having a set of (at least one) program modules 8205. Such program modules 8205 include but are not limited to: an operating system, one or more application programs, other program modules, and program data. Each of these examples or some combination may include an implementation of the network environment.

The bus 830 may be one or more of several types of bus structures, including a storage unit bus or a storage unit controller, a peripheral bus, a graphics acceleration port, a processing unit, or a local area bus using any of a variety of bus structures.

The electronic device 800 may also communicate with one or more external devices 700 (e.g., a keyboard, pointing device, Bluetooth device, etc.), and may further communicate with one or more devices that enable a user to interact with the electronic device 800, and/or may communicate with any device (e.g., a router, modem, etc.) that enables the electronic device 800 to communicate with one or more other computing devices. This communication may be performed through an input/output (I/O) interface 850. Moreover, the electronic device 800 may also communicate with one or more networks (such as a local area network (LAN), a wide area network (WAN), and/or a public network, such as the Internet) through a network adapter 860. As shown in the figure, the network adapter 860 communicates with other modules of the electronic device 800 through the bus 830. It should be understood that although not shown in the figure, other hardware and/or software modules may be used in conjunction with the electronic device 800, including but not limited to: a microcode, a device driver, a redundant processing unit, an external disk drive array, an RAID system, a tape drive, a data backup storage system and the like.

Through the description of the above embodiments, those skilled in the art can easily understand that the example embodiments described here can be implemented by software, or can be implemented by software in combination with necessary hardware. Therefore, the technical solution according to the embodiments of the present disclosure may be embodied in the form of a software product, which may be stored in a non-volatile storage medium (which may be a CD-ROM, U disk, mobile hard disk, etc.) or on a network, and may several instructions to cause a computing device (which may be a personal computer, server, terminal device, or network device, etc.) to perform the method according to the embodiments of the present disclosure.

In an exemplary embodiment of the present disclosure, there is also provided a computer-readable storage medium on which a program product capable of implementing the above method of this specification is stored. In some possible implementations, various aspects of the present disclosure may also be implemented in the form of a program product, which includes program codes, and when the program product runs on a terminal device, the program codes are configured to enable the terminal device to execute the steps in various exemplary embodiments of the present disclosure described in the "exemplary method" section of this specification.

Figure 9:
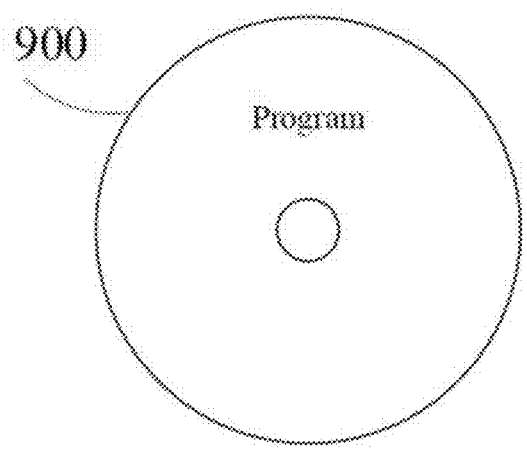
FIG. 9 schematically shows a computer-readable storage medium for implementing the above message processing method.

Referring to FIG. 9, a program product 900 for implementing the above method according to an embodiment of the present disclosure is described. It may use a portable compact disk read-only memory (CD-ROM) and include program codes, and may run on a terminal device such as a personal computer. However, the program product of the present disclosure is not limited thereto. In this document, the readable storage medium may be any tangible medium containing or storing programs, which may be used by or in combination with an instruction execution system, apparatus, or device.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, device, or element, or any combination thereof. More specific examples of readable storage media (non-exhaustive list) include: an electrical connection with one or more wires, portable disk, hard disk, random access memory (RAM), read only memory (ROM), erasable programmable read-only memory (EPROM or flash memory), optical fiber, portable compact disk read-only memory (CD-ROM), optical storage device, magnetic storage device, or any suitable combination thereof.

The computer-readable signal medium may include a data signal that is transmitted in baseband or as part of a carrier wave, in which a readable program code is carried. Such transmitted data signal can take many forms, including but not limited to an electromagnetic signal, optical signal, or any suitable combination thereof. The readable signal medium may also be any readable medium other than a readable storage medium, and the readable medium may send, propagate, or transmit a program for use by or in combination with an instruction execution system, apparatus, or device.

The program code contained on the readable medium may be transmitted via any appropriate medium, including but not limited to wireless, wired, optical fiber cable, RF, etc., or any suitable combination thereof.

The program codes for performing the operations of the present disclosure can be written in any combination of one or more programming languages, including object-oriented programming languages such as Java, C++, etc., as well as conventional procedural programming languages such as "C" language or similar programming languages. The program codes may be executed entirely on a user's computing device, partly on the user's device, as an independent software package, partly on the user's computing device and partly on a remote computing device, or entirely on the remote computing device or server. In situations involving remote computing devices, the remote computing device may be connected to the user computing device through any kind of network, including a local area network (LAN) or a wide area network (WAN), or may be connected to an external computing device (for example, via the Internet provided by an Internet service provider).

In addition, the above-mentioned drawings are only schematic illustrations of the processes included in the method according to the exemplary embodiment of the present disclosure, and are not intended to be restrictive. It is easy to understand that the processes shown in the above drawings do not indicate or limit a chronological order of these processes. In addition, it is also easy to understand that these processes may be performed synchronously or asynchronously in multiple modules, for example.

After considering the description and practicing the invention disclosed herein, those skilled in the art will easily conceive of other embodiments of the present disclosure. This application is intended to cover any variations, uses, or adaptive changes of the present disclosure that follow the general principles of the present disclosure and include common knowledge or customary technical means in the technical field not disclosed in the present disclosure. The description and examples are to be considered exemplary only, and the true scope and spirit of the present disclosure are pointed out by the claims.

What is claimed is:

1. A message processing method, comprising:
   receiving a first request comprising a first resource identifier;
   determining whether the first resource identifier exists in a group resource comprising a plurality of second resource identifiers and group members corresponding to the second resource identifiers one by one; and
   sending the first request to other group member in the group resource and not to the group member corresponding to the first resource identifier in the group resource when determining that the first resource identifier exists in the group resource,
   wherein the first request comprises at least one of: a creating request, an updating request, a deleting request, a retrieving request, a subscribing request, and a notifying request.

2. The message processing method according to claim 1, further comprising, after determining whether the first resource identifier exists in a group resource comprising a plurality of second resource identifiers and group members corresponding to the second resource identifiers one by one, sending the first request to all of the group members in the group resource when determining that the first resource identifier does not exist in the group resource.

3. The message processing method according to claim 1, wherein:
   the group resource comprises a group member set, and the group member set comprises one or more of the second resource identifiers; and
   determining whether the first resource identifier exists in a group resource comprising a plurality of second resource identifiers and group members corresponding to the second resource identifiers one by one comprises: determining whether the first resource identifier exists in the group member set.

4. The message processing method according to claim 1, wherein:
   the group resource comprises a resource set, and the resource set comprises one or more of the second resource identifiers; and
   determining whether the first resource identifier exists in a group resource comprising a plurality of second resource identifiers and group members corresponding to the second resource identifiers one by one comprises: determining whether the first resource identifier exists in the resource set.

5. The message processing method according to claim 4, wherein the resource set comprises one or more of a created resource list, an updated resource list, a deleted resource list, a retrieved resource list, a subscribed resource list, and a notified resource list.

6. The message processing method according to claim 1, further comprising, after sending the first request to other group member in the group resource than the group member corresponding to the first resource identifier: receiving and aggregating a response message sent by the other group member in response to the first request, and sending the response message aggregated to the group member corresponding to the first resource identifier.

7. The message processing method according to claim 3, further comprising, after sending the first request to other group member in the group resource than the group member corresponding to the first resource identifier: storing the respective second resource identifier in the group resource into the group member set in the group resource.

8. The message processing method according to claim 2, wherein:
the group resource comprises a resource set, and the resource set comprises one or more of the second resource identifiers;
the message processing method further comprises, after sending the first request to all of the group members in the group resource: adding the first resource identifier to the resource set.

9. The message processing method according to claim 5, further comprising:
receiving a second request comprising a third resource identifier, and determining whether the third resource identifier exists in the subscribed resource list; and
sending the second request to other group member than the group member corresponding to the respective resource identifier in the subscribed resource list when determining that the third resource identifier exists in the subscribed resource list.

10. A non-transitory computer-readable storage medium having a computer program stored thereon, wherein the computer program, when executed by at least one hardware processor, causes the at least one hardware processor to implement a message processing method comprising:
receiving a first request comprising a first resource identifier;
determining whether the first resource identifier exists in a group resource comprising a plurality of second resource identifiers and group members corresponding to the second resource identifiers one by one; and
sending the first request to other group member in the group resource and not to the group member corresponding to the first resource identifier in the group resource when determining that the first resource identifier exists in the group resource,
wherein the first request comprises at least one of: a creating request, an updating request, a deleting request, a retrieving request, a subscribing request, and a notifying request.

11. The non-transitory computer-readable storage medium according to claim 10, wherein the message processing method further comprises, after determining whether the first resource identifier exists in a group resource comprising a plurality of second resource identifiers and group members corresponding to the second resource identifiers one by one, sending the first request to all of the group members in the group resource when determining that the first resource identifier does not exist in the group resource.

12. An electronic device, comprising:
at least one hardware processor; and
a memory comprising program instructions executable by the at least one hardware processor stored thereon that, when executed, direct the at least one hardware processor to implement a message processing method comprising:
receiving a first request comprising a first resource identifier;
determining whether the first resource identifier exists in a group resource comprising a plurality of second resource identifiers and group members corresponding to the second resource identifiers one by one; and
sending the first request to other group member in the group resource and not to the group member corresponding to the first resource identifier in the group resource when determining that the first resource identifier exists in the group resource,
wherein the first request comprises at least one of: a creating request, an updating request, a deleting request, a retrieving request, a subscribing request, and a notifying request.

13. The electronic device according to claim 12, wherein the message processing method further comprises, after determining whether the first resource identifier exists in a group resource comprising a plurality of second resource identifiers and group members corresponding to the second resource identifiers one by one, sending the first request to all of the group members in the group resource when determining that the first resource identifier does not exist in the group resource.

14. The electronic device according to claim 12, wherein:
the group resource comprises a group member set, and the group member set comprises one or more of the second resource identifiers; and
determining whether the first resource identifier exists in a group resource comprising a plurality of second resource identifiers and group members corresponding to the second resource identifiers one by one comprises: determining whether the first resource identifier exists in the group member set.

15. The electronic device according to claim 12, wherein:
the group resource comprises a resource set, and the resource set comprises one or more of the second resource identifiers; and
determining whether the first resource identifier exists in a group resource comprising a plurality of second resource identifiers and group members corresponding to the second resource identifiers one by one comprises: determining whether the first resource identifier exists in the resource set.

16. The electronic device according to claim 15, wherein the resource set comprises one or more of a created resource list, an updated resource list, a deleted resource list, a retrieved resource list, a subscribed resource list, and a notified resource list.

17. The electronic device according to claim 12, wherein the message processing method further comprises, after sending the first request to other group member in the group resource than the group member corresponding to the first resource identifier:
receiving and aggregating a response message sent by the other group member in response to the first request, and sending the response message aggregated to the group member corresponding to the first resource identifier.

18. The electronic device according to claim 14, wherein the message processing method further comprises, after sending the first request to other group member in the group resource than the group member corresponding to the first resource identifier:
storing the respective second resource identifier in the group resource into the group member set in the group resource.

19. The electronic device according to claim 13, wherein:
the group resource comprises a resource set, and the resource set comprises one or more of the second resource identifiers; and
the message processing method further comprises, after sending the first request to all of the group members in the group resource: adding the first resource identifier to the resource set.

20. The electronic device according to claim 16, wherein the message processing method further comprises:
receiving a second request comprising a third resource identifier, and determining whether the third resource identifier exists in the subscribed resource list; and
sending the second request to other group member than the group member corresponding to the respective resource identifier in the subscribed resource list when determining that the third resource identifier exists in the subscribed resource list.

\* \* \* \* \*